Figure 1:
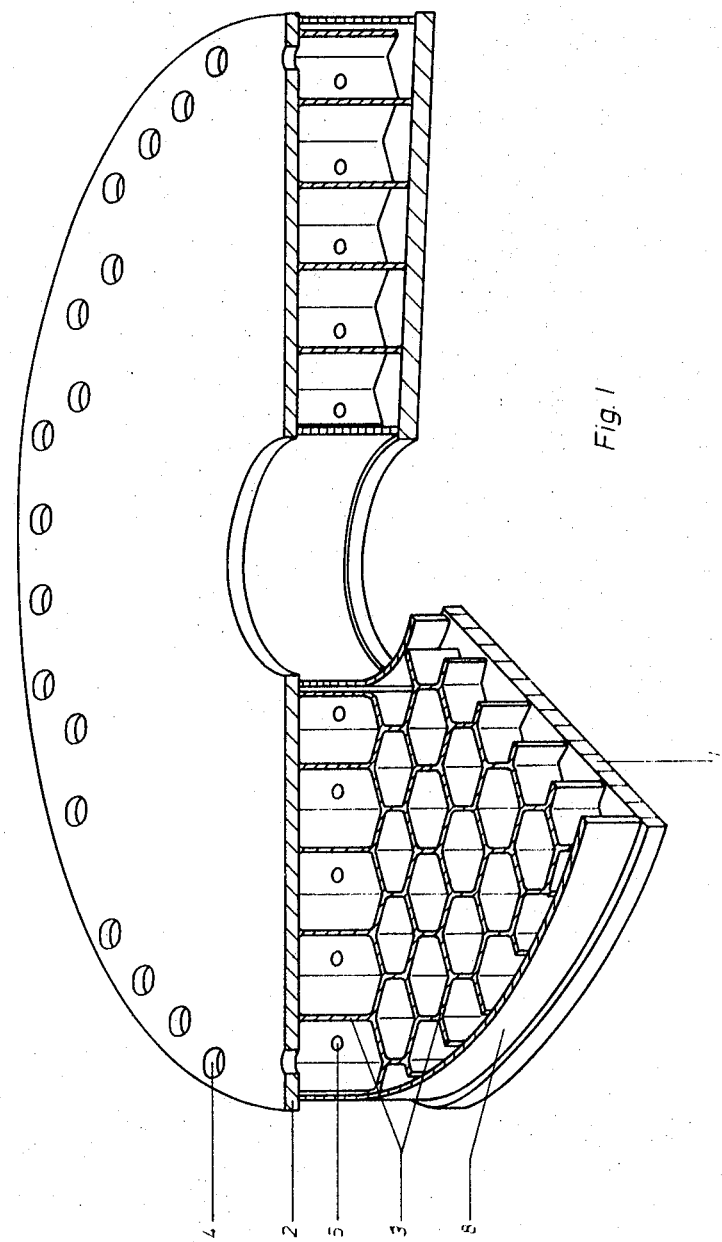

United States Patent

Jagdt et al.

[15] 3,644,022
[45] Feb. 22, 1972

[54] OPTICAL MIRROR

[72] Inventors: Reinhard Jagdt, Mainz-Gonsenheim; Ingo Kloss, Grossauheim, both of Germany

[73] Assignee: Heraeus-Schott Quarzschmelze GmbH, Hanau am Main, Germany

[22] Filed: Sept. 14, 1970

[21] Appl. No.: 72,062

[30] Foreign Application Priority Data

Oct. 18, 1969 Germany.....................P 19 52 584.9

[52] U.S. Cl. ............................................................350/310
[51] Int. Cl. ..............................................................G02b 5/08
[58] Field of Search...................350/288, 292, 293, 299, 310

[56] References Cited

UNITED STATES PATENTS 3,453,041  7/1969  Rantsch................................350/310

FOREIGN PATENTS OR APPLICATIONS 968,025  9/1964  Great Britain..........................350/310
998,983  7/1965  Great Britain..........................350/310

Primary Examiner—David Schonberg
Assistant Examiner—Michael J. Tokay
Attorney—Burgess, Dinklage & Sprung

[57] ABSTRACT

An optical mirror essentially consisting of a material containing silicon dioxide, for example, quartz glass, comprising a reflective plate, a carrier plate, and a supporting frame intermediate said plates and connecting them to each other and having a honeycomb structure consisting of a plurality of hexagonal cells, in which the supporting frame is composed of a plurality of Y-shaped elements and the outer longitudinal edges of the three wings of each of these elements are welded together with the corresponding edges of the wings of the adjacent elements so that each hexagonal cell is formed by two wings of each of three adjacent elements.

5 Claims, 3 Drawing Figures

INVENTORS
REINHARD JAGDT
INGO KLOSS

OPTICAL MIRROR

The present invention relates to optical mirrors which consist of a material containing silicon dioxide and are made of a lightweight construction.

Optical mirrors of this type are already disclosed in the British Pat. No. 968,025, in which a reflective plate is supported on a carrier plate by means of a supporting frame which consists of a plurality of tubes. Each of these supporting tubes is preferably made of a hexagonal cross section, and the adjacent tubes are directly connected to each other without any space between them so as to form a network of cells of a honeycomb structure.

It is an object of the present invention to improve and facilitate the production of such optical mirrors which are provided with a honeycombed supporting frame the individual cells of which have a hexagonal cross section.

For attaining this object of producing an optical mirror of a lightweight construction which is especially useful for astronomical and similar purposes and is made of a material containing silicon dioxide, and which comprises a reflecting plate, a carrier plate, and a supporting frame of a honeycomb structure between these two plates which consists of a plurality of cells of a hexagonal cross section, the present invention provides that the mentioned honeycombed supporting frame is composed of a plurality of Y-shaped elements which are welded along their longitudinal edges to each other. These Y-shaped elements are successively applied upon each other and welded together in a series of steps so as to build up the honeycomb structure of the supporting frame. Such Y-shaped elements have the great advantage that they may be more easily produced by a conventional drawing process than, for example, tubes of a hexagonal cross section as previously used for producing such a honeycombed supporting frame. The use of such Y-shaped elements has the further advantage that is any of these elements are damaged, they may be easily severed and removed from the complete frame and be replaced by new elements. While for producing such a honeycombed frame of a high solidity in the previous manner of individual tubes of a hexagonal cross section it was necessary to weld or fuse all sidewalls of each tube together with the sidewalls of the adjacent tubes, the use of the Y-shaped elements according to the invention only requires a few longitudinal welds for securing these elements to each other. Due to such few welds, the supporting frame according to the invention is also only affected by very small, if any, internal tensions.

The Y-shaped elements according to the invention are preferably designed so that each element consists of three wings and each wing extends at an angle of 120° to the adjacent wing. It has been found especially advisable to make all three wings of each Y-shaped element of the same length.

However, very solid supporting frames may also be made of Y-shaped elements in which at least one wing of each element has a greater length than at least one other wing. The longer wing should then be at least 1.2 to 1.5 times longer than the shortest of the other wings. Each wing of any Y-shaped element may have a width within a range of 1.5 mm. to 8.0 mm. and preferably of 2.0 mm. to 4.0 mm. and it may be made of any desired height.

Figure 2:
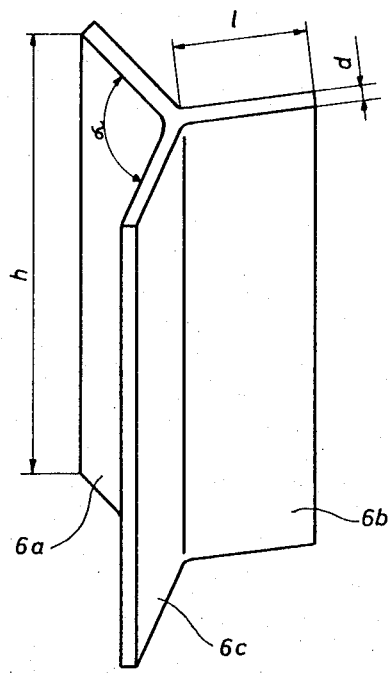
Figure 3:
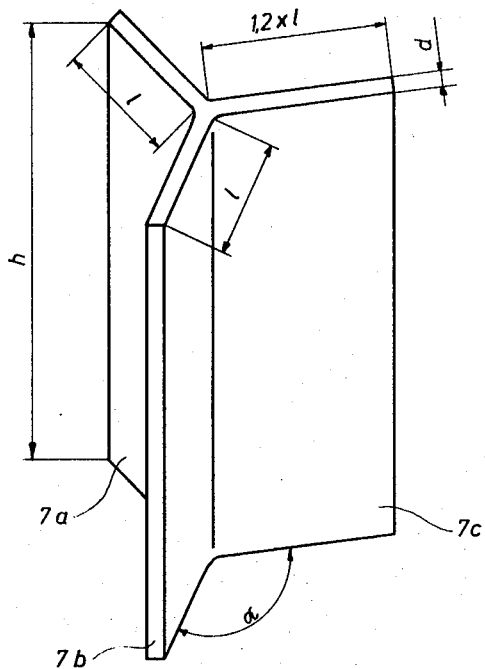

The features and advantages of the present invention will become further apparent from the following detailed description thereof which is to be read with reference to the accompanying drawings, in which FIG. 1 shows a perspective view of a segment of an optical mirror according to the invention, a part of which is broken away and shown in section; while FIGS. 2 and 3 show perspective views of individual Y-shaped elements according to two different embodiments of the invention.

As illustrated in FIG. 1, the optical mirror according to the invention comprises a reflective plate 1, a carrier plate 2, and a cellular supporting frame 3 which is welded together with the reflective plate 1 and the carrier plate 2. This cellular supporting frame 3 has a honeycomb structure and consists of a plurality of Y-shaped elements, two different embodiments of which are shown in FIGS. 2 and 3. The honeycomb structure of the supporting frame 3 is preferably built up by applying the adjacent Y-shaped elements successively on each other so that their outer longitudinal edges abut against each other and by welding these longitudinal edges together. Thus, each hexagonal cell of the supporting frame is composed of three Y-shaped elements. For equalizing the pressure between the cells of the supporting frame, the carrier plate 2 is preferably provided with ventilating holes 4. In place of or in addition to these ventilating holes 4 it is also possible to provide the individual Y-shaped elements with ventilating holes 5. In the latter case, the peripheral wall surfaces 8 of the mirror and/or the hexagonal cells adjacent to these surfaces are ventilated through ventilating holes in the carrier plate 2.

The material which has been found to be especially suitable for producing the optical mirror as above described, that is, its individual parts consisting of the reflective plate 1, the carrier plate 2, the supporting frame 3, and the peripheral walls 8, consists of fused silica or quartz glass.

The height of the supporting frame 3 and the length of the three wings of each Y-shaped element of this frame depend upon the desired dimensions of the reflective plate 1 and must be made of such sizes that the reflective plate 1 will be reliably supported so that none of its parts which are disposed above the openings of the hexagonal cells of the frame might sag due to their own weight.

FIG. 2 illustrates, for example, one of the Y-shaped elements of the supporting frame 3. It consists of the three wings 6a, 6b and 6c which have an equal length L, for example, of 45 mm. a thickness $d$ of 3 mm. and a height $h$ of 150 mm. and each wing is disposed at an angle $\alpha$ of 120° to the adjacent wing.

The honeycomb structure of the supporting frame may, however, also be varied by making at least one of the wings of each Y-shaped element of a length different from that of the other wings. Thus, for example, as shown in FIG. 3, two of the wings 7a and 7b are made of the same length L, while the third wing 7c is made at least 1.2 times longer than the two other wings.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. An optical mirror essentially consisting of a material containing silicon dioxide and comprising a reflective plate, a carrier plate, and a supporting frame having a honeycomb structure intermediate said two plates and connecting the same to each other and forming a plurality of cells of a hexagonal cross section, wherein said supporting frame comprises a plurality of Y-shaped elements each including three wings having outer longitudinal edges welded to the corresponding edges of the adjacent Y-shaped elements.

2. An optical mirror as defined in claim 1, in which the adjacent wings of each Y-shaped element are disposed at an angle of substantially 120° to each other.

3. An optical mirror as defined in claim 1, in which said three wings of each Y-shaped element have the same length.

4. An optical mirror as defined in claim 1, in which at least one of said wings of each Y-shaped element has a length greater than at least one of the two other wings.

5. An optical mirror as defined in claim 1, in which one of said wings has a length at least 1.2 times greater than the length of the shortest of the other wings of the same element.

* * * * *